Dec. 1, 1953 J. A. WALSH 2,661,041
TREAD CONSTRUCTION FOR TIRE CASINGS
Filed March 23, 1950
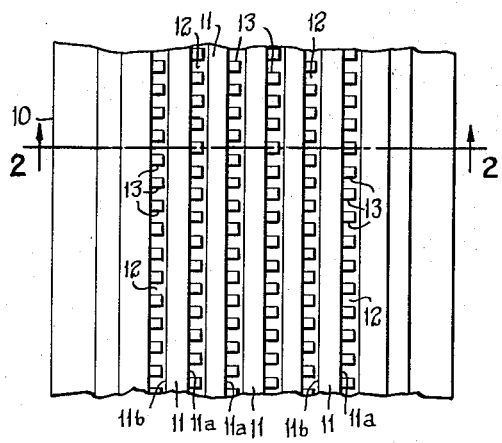
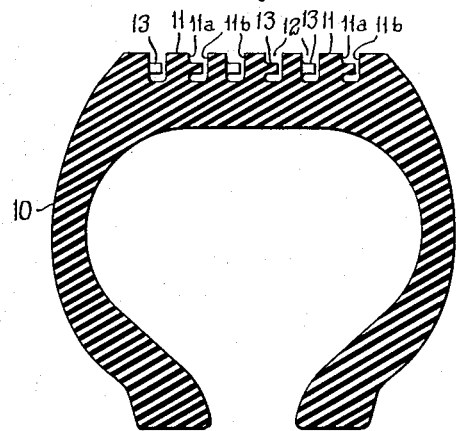
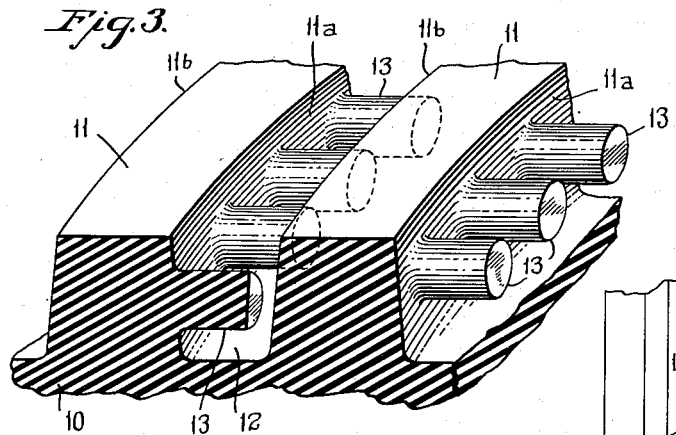
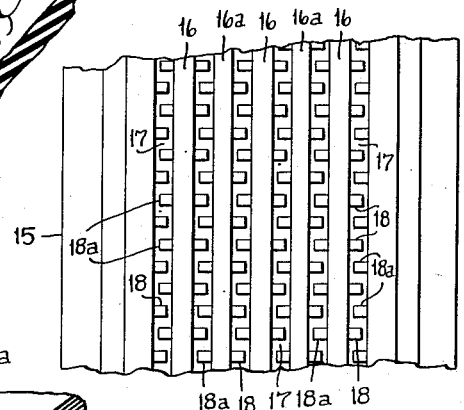
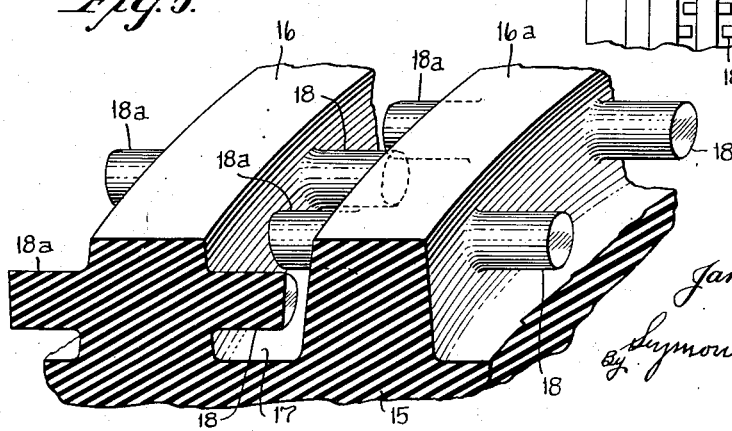
James A. Walsh
Inventor
Attorneys

Patented Dec. 1, 1953

2,661,041

UNITED STATES PATENT OFFICE 2,661,041

TREAD CONSTRUCTION FOR TIRE CASINGS

James A. Walsh, West Haven, Conn., assignor to The Armstrong Rubber Company, West Haven, Conn., a corporation of Connecticut Application March 23, 1950, Serial No. 151,411

8 Claims. (Cl. 152—209)

This invention relates in general to tire treads having for one of its objects the provision of a novel tread construction for tire casings, and particularly designed and adapted to provide better traction, a substantial reduction of the customary squealing sounds arising when a vehicle is rounding a sharp curve, and an improved shock-absorbing action.

Another object of the invention is to provide a tread construction for tire casings having means incorporated in the tread to lessen road shocks, provide better directional stability, and a minimizing of side skidding.

A further object of the invention is the provision of an anti-vibration and deflection-resisting tire tread, having improved means to resist tread deformation, provide additional stability when rounding corners, and a highly efficient, shock-absorbing construction.

The invention contemplates broadly the elimination of certain defects found in conventional tires wherein the surface ribs of the treads are in large measure isolated or rendered independent by their adjacent grooves, thus affording only moderate stability, since they tend to give up the energy stored during deflection and deformation occasioned by driving strains and road shocks, etc., and thus fail to provide a high degree of shock-absorbing action that promotes added riding comfort. Furthermore, since the ribs, as mentioned above, are independent, they are free to vibrate and consequently squeal without interference, particularly while making turns at comparatively high speed.

A prior proposal suggested for overcoming the foregoing disadvantages involves providing, on the side of the ribs, protuberances, which extend to the base of the rib at spaced intervals along the length of the grooves to help prevent undue lateral distortion or collapse of the ribs. However, since these protuberances extend to the base of the rib, they constitute, in reality, a narrow groove adjacent each protuberance. Consequently, the rubber at the bottom of these narrow grooves is subjected to heavy strain and flexing due to the fact that most of the forces resisting lateral distortion of the ribs are concentrated at the narrow groove portions formed by these protuberances. This causes cracks in the rubber at the bottom of the narrow grooves because of the high stresses at these points.

Another proposal for providing lateral stability to the ribs in tire treads comprises forming lateral projections in the grooves defined by the ribs at the ground engaging surface of the tread. This avoids the difficulty presented by the use of narrow grooves but has the disadvantage of trapping stones and the like in the grooves under the protuberances, thus causing cutting or gouging of the rubber by the stones in the vulnerable region at the base of the groove. Furthermore, this manner of providing stability for the tread actually constitutes a ready means of closing the grooves at the road engaging surface of the tread instead of holding them open as is most desirable in order to obtain better traction.

The present invention provides a practical means of stabilizing the tread while at the same time avoiding the difficulties encountered in these prior proposals. In brief, this invention overcomes the serious disadvantage of the narrow groove by maintaining the full width along the entire length of the tread groove at its base, thereby virtually eliminating the undue flexing and strain on the rubber in this region which is caused by forming narrow portions in the grooves at intervals along the circumference of the tire. As hereinafter more fully described, this invention contemplates providing closely spaced projections which are circumferentially arranged on the sidewalls of the grooves and which are spaced a substantial distance from the base of the grooves in order to maintain the full groove width at the bottom of the groove where cracking is most likely to occur. Furthermore, the projections or protuberances are spaced from the road engaging surfaces of the ribs so that they will not trap stones but will permit them to be thrown out. Likewise, as the tread comes in contact with the road, the protuberances will contact the opposite sidewall of the groove, holding the ribs apart at the road engaging surface to provide good traction while preventing vibration and excessive distortion of the ribs.

Accordingly, the hereinabove mentioned disadvantages of previous tire treads are obviated by the design and novel construction of the tire tread of the present invention, which not only affords better traction and shock-absorbing properties, and particularly guards against side skidding, but also substantially reduces the disagreeable squealing effects produced when rounding corners, even at moderate speed. The construction itself is also, by virtue of its novel design, adapted to have improved wear-resistant qualities and a consequent comparatively long life.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a fragmentary plan or edge view of a tire looking toward the outer periphery thereof and showing one form which a tire tread may assume in accordance with the present invention;

Fig. 2 is a transverse sectional view of the tire taken on line 2—2 of Fig. 1, but omitting certain structural details of the casing for clarity of illustration;

Fig. 3 is an enlarged fragmentary perspective view of a portion of a tire tread fabricated in accordance with the present invention;

Fig. 4 is a view similar to Fig. 1 and showing another form which a tire tread may assume in accordance with this invention; and Fig. 5 is a view similar to Fig. 3 of the modified form of the invention shown in Fig. 4.

Referring now to the drawings, wherein similar characters of reference indicate corresponding parts in the preferred forms of the invention, and referring more particularly to Figs. 1 to 3, 10 designates generally a tire casing embodying the design and construction of the invention and having a plurality of circumferentially extending ribs 11 along its periphery or road-engaging surface, the said ribs being separated in spaced substantial parallelism by grooves 12. Although, as illustrated, the ribs and grooves are uniformly circular with respect to their disposition on the tread-portion of the tire casing, it will be understood that they may be arranged in serpentine or other fashion, if desired.

As an important feature of the invention, each of the ribs 11 has integrally formed therewith and projecting laterally from one of its sidewalls 11a, a continuous series of protuberances or snubbing lugs 13, preferably of substantially cylindrical configuration and arranged circumferentially in spaced relation below the road-engaging surface or periphery of the said rib. A further important feature of the invention lies in spacing the lugs 13 a substantial distance away from the bases of the grooves 12 so that each groove is of substantially the same width or only slightly narrower at its base than at the road engaging surface in order to avoid cracking of the rubber at the bottom of the grooves. In other words, the lugs 13 should not extend to the bottom of the grooves 12 because this would form a narrow portion on the bottom of the groove at each lug, causing cracking at these points. The axis of each cylindrical lug 13 is substantially perpendicular to the sidewall to which it is attached so that when the lugs engage the adjacent ribs they will provide maximum stability in the tread. Moreover, as is apparent from the drawings, lugs 13 are relatively large with respect to the depth and width of the grooves 12. Thus, at its free end the width of each lug measured perpendicular to the base of the groove is approximately half the depth of the groove. Furthermore, each lug extends laterally substantially two-thirds of the way or more across the groove to ensure that, upon deflection of the walls of the groove toward each other, the free ends of the lugs engage the opposite sidewall to hold the groove open at the road-engaging surface of the tread. By way of example, each lug may be as much as two-thirds or three-quarters of the actual width of the groove. Moreover, the lugs are squared-off flat at their free ends where they are substantially as wide as they are at their bases. However, when the tire is mounted on a vehicle wheel and inflated, that portion of the tire which is in contact with the ground is slightly deformed so that even under normal driving conditions, the ribs of the tread portion of the tire, and in particular the outer ribs thereof, are deflected laterally. Consequently, depending on the amount of lateral deflection, the ends of the lugs of the laterally deflected ribs are brought into engagement with the walls of the opposite ribs, thereby reinforcing the latter so as to preclude further closing of the grooves by excessive deflection or distortion. Moreover, engagement of the ends of the lugs with the walls of the oppositely disposed ribs serves to dampen the vibration of the ribs and hence to prevent noise.

As illustrated and by way of example, the snubbing lugs 13 are uniformly located on the right sidewalls 11a of each rib 11. It will be understood, of course, that if preferred, they may be located on the left sidewall of each rib without affecting the functioning of the tire.

The function and operation of the tire tread depicted in Figs. 1 to 3 inclusive has been, in part, indicated from the foregoing description, but may be summarized as follows: Under normal driving conditions and when a vehicle, equipped with the tires of this invention, is maintaining an approximately straight course upon a road, the ribs 11 and grooves 12 of that part of the tread portion which is in engagement with the road will be deflected somewhat, but not excessively, so that the ends of the lugs of one rib are in immediate proximity to the walls of the opposite rib. However, during any swaying movements of the vehicle as, for example, when rounding a curve or meeting an irregularity, etc., in the surface of the roadway, one or more of the ribs 11, for example, will be subjected to a laterally deflecting thrust adjacent its point of contact with the said roadway, in excess of its normal lateral thrust. This excessive lateral deflecting thrust will push the ends of one or more of the snubbing lugs 13 formed on one side of the deflected rib, against the sidewall 11b of the opposite rib 11, and the latter, even though partially deflected, will reinforce or back up the deflected rib, thus minimizing further lateral movement or deformation thereof. Vibration of the deflected rib and the rib contacted by the lugs of the said deflected rib will also be substantially prevented, thus obviating squealing sounds. It will be also understood that the deflected rib itself may be engaged on its opposite side by the ends of the snubbing lugs of an adjacent rib.

The positioning of the snubbing lugs with respect to the depth and width of the groove, and their own spaced-apart relation is such as to substantially minimize their retention of mud and objects such as stones, etc. The design and construction affords substantial advantages over a so-called stone-expelling continuous thin rib sometimes provided on the ribs or in the grooves of a tire. This rib, however, had a noticeable tendency to retain substances like mud, and it was not designed nor capable to serve as a deflection-resisting or antivibration component of the tire.

It will be noted that the action of the snubbing lugs tends to maintain the ribs of the tread portion in their substantially upright relationship with respect to the adjacent grooves, so that the resistance of the tire tread to skidding, as customarily provided by such grooves and ribs, is maintained under the conditions mentioned, or when rounding a corner, for example. As a further effect of the action of the present snubbing lugs, it may be pointed out that when the deflection or deformation of the ribs is comparatively severe, the snubbing lugs themselves are subjected to compression and distortion which, in turn, through the action of hysteresis, will absorb energy in such wise as to serve as a shock absorber.

The tire tread of this invention, in the manner described above, provides greater riding comfort, and is also reinforced against excessive deflection and deformation. The action of the tread in minimizing vibration and consequent squeals when rounding corners, has been alluded to above. In this last-mentioned instance, contact of the snubbing lugs with the sidewall of the opposite rib will dampen the vibrations of said opposite rib, and hence prevent the setting up of undesirable squealing sounds.

In the modified form of the invention depicted in Figs. 4 and 5, a tire casing designated generally at 15 is provided with a plurality of similar ribs as, for example, 16 and 16a, circumferentially arranged on the tread portion in parallelism and uniformly spaced by similarly disposed parallel grooves 17 on the tread portion of the tire. As in the case of the first form of the invention, the ribs and grooves may be provided in serpentine or other configurations instead of the circular disposition actually illustrated, if desired.

In each groove 17 are located circumferentially spaced cylindrical lugs 18 projecting from one sidewall of the groove and lugs 18a projecting from the opposite sidewall, a lug 18a being interposed between successive lugs 18. Lugs 18, 18a are spaced from the road engaging surfaces of ribs 16, 16a to prevent stones and the like from being trapped under them in grooves 17. Furthermore, they are spaced from the bases of grooves 17 to maintain the full groove width at the bottom of each groove for the purpose stated hereinbefore in connection with the embodiment of the invention shown in Figs. 1 to 3.

As in the first form of the invention, it is preferred to have the ends of the snubbing lugs spaced only slightly from the sidewall of the groove opposite the one from which each lug projects, so as to enable the ends of the lugs to move laterally substantially into engagement with the walls of the opposite ribs respectively during normal driving conditions and, upon further lateral deflection of the ribs, to support the opposite rib. The two series of snubbing lugs, it will be observed, when viewed in plan or perspective, are arranged in staggered or alternate relation, so that the lugs 18a on the left-hand side of rib 16a, for example, will, on suitable occasions, engage or be engaged by the right-hand side of the opposite rib 16, and vice versa.

In the instant form of the invention, the operation is substantially similar to that mentioned above in connection with the form shown in Figs. 1 to 3 inclusive. Appreciable deflections and deformations of any of the plurality of ribs will push the ends of one or more of the lugs thereon against the side of the opposite rib, while the ends of the snubbing lugs of the last-mentioned rib will, in turn, push against the wall of the rib undergoing deflection and deformation. Here, again, the net result is to substantially minimize any tendency of the ribs of the tire tread to vibrate and consequently squeal when rounding corners. The same advantages, with respect to improved traction, prevention of side skidding and greater riding comfort, are also afforded by this design.

It will be understood that as many grooves or ribs as may be desired may be incorporated in the tire tread and that it is within the purview of the invention to include other modifications of the lug arrangement such as, for example, by providing some ribs with lugs and some without lugs, or by forming the lugs on one rib in substantially opposite aligned relationship with the lugs of the opposite rib.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A tire having a tread portion comprising a plurality of laterally spaced circumferentially extending continuous ribs defining a groove comprising oppositely facing sidewalls and a base, a multiplicity of closely spaced circumferentially arranged protuberances projecting laterally from at least one of said sidewalls, said protuberances being spaced a substantial distance from both the base of the groove and the road-engaging surface of said ribs so that the spaces above and below said protuberances are the full groove width along the entire length of said groove, the width of each of said protuberances measured perpendicular to the base of said groove at its free end being equal to approximately one-half the depth of said groove and said protuberances extending across said groove a distance of at least two-thirds of the width of said groove, so that upon lateral deflection of said sidewalls toward each other the ends of the protuberances engage the opposite sidewall of the groove to hold the groove open at the road-engaging surface of the tread.

2. A tire having a tread portion as defined in claim 1 wherein said protuberances extend across said groove a distance of from two-thirds to three-quarters the width of said groove.

3. A tire having a tread portion comprising a plurality of laterally spaced circumferentially extending continuous ribs defining a groove comprising oppositely facing sidewalls and a base, a multiplicity of closely spaced circumferentially arranged protuberances projecting laterally from at least one of said sidewalls, said protuberances being spaced a substantial distance from both the base of the groove and the road-engaging surface of said ribs so that the spaces above and below said protuberances are the full groove width along the entire length of said groove, the width of each of said protuberances measured perpendicular to the base of said groove at its free end being equal to approximately one-half the depth of said groove and said protuberances extending across said groove a distance of substantially two-thirds of the width of said groove, so that upon lateral deflection of said sidewalls toward each other the ends of the protuberances engage the opposite sidewall of the groove to hold the groove open at the road-engaging surface of the tread.

4. A tire having a tread portion as defined in claim 3 wherein said protuberances project from one sidewall of said groove.

5. A tire having a tread portion as defined in claim 1 wherein successive protuberances project from opposite sidewalls of said groove.

6. A tire having a tread portion as defined in claim 1 wherein said ribs define a plurality of grooves each of which is provided with said protuberances.

7. A tire having a tread portion as defined in claim 1 wherein said protuberances are cylindrical lugs having their individual axes substantially perpendicular to the sidewalls from which they project.

8. A tire having a tread portion comprising a plurality of laterally spaced circumferentially extending continuous ribs defining a groove comprising oppositely facing sidewalls and a base, a multiplicity of closely spaced circumferentially arranged protuberances projecting laterally from at least one of said sidewalls, each of said protuberances being spaced in its entirety a substantial distance from both the base of the groove and the road-engaging surface of said ribs so that the spaces above and below said protuberances are the full groove width along the entire length of said groove, the width of each of said protuberances measured perpendicular to the base of said groove at its free end being at least one-half the depth of said groove and said protuberances extending across said groove a distance of at least two-thirds of the width of said groove, so that upon lateral deflection of said sidewalls toward each other the ends of the protuberances engage the opposite sidewall of the groove to hold the groove open at the road-engaging surface of the tread.

JAMES A. WALSH.

References Cited in the file of this patent

UNITED STATES PATENTS

| Number | Name | Date |
|---|---|---|
| 2,121,871 | Havens | June 28, 1938 |
| 2,265,543 | Overman | Dec. 9, 1941 |
| 2,290,625 | Stein | July 21, 1942 |
| 2,322,505 | Bull | June 22, 1943 |